United States Patent Office 3,748,163
Patented July 24, 1973

---

3,748,163
PIGMENT COMPOSITIONS AND METHODS THEREFOR
Thomas D. Mutaffis, North Plainfield, and Melvin G. Schnieder, Roselle, N.J., and John Gaczi, Staten Island, N.Y., assignors to GAF Corporation, New York, N.Y.
No Drawing. Filed Apr. 21, 1971, Ser. No. 136,233
Int. Cl. C09c
U.S. Cl. 106—288 Q    19 Claims

ABSTRACT OF THE DISCLOSURE

Organic pigment compositions are provided exhibiting improved dispersibility in a wide variety of vehicle systems comprising an organic pigment such as a metal tetrazaporphine, carbazole or diazine pigment intimately admixed with a metal salt of naphthenic acid or octanoic acid, the metal being either zirconium, barium, iron, zinc, calcium, antimony, lithium or strontium.

Methods are also provided for contacting a dispersion of the organic pigment with the metal salt and subjecting the resulting mixture to agitation to obtain a low viscosity, high pigment ratio dispersion.

---

This invention relates to improved pigment compositions and methods for the production thereof. More particularly, this invention relates to pigment compositions exhibiting improved dispersibility and improved strength of color development in a wide variety of vehicle systems. Moreover, these pigment compositions form low viscosity dispersions.

Pigments are extremely finely divided solids ordinarily substantially insoluble in their environment. They have many varied uses, for example, as components in decorative and protective coatings in elastomeric and plastic compositions, in printing inks, textile pastes, lacquers, paints and in rigid bodies such as masonry, refractories, ceramics, and the like. In such compositions, pigments are used for imparting chroma, hue, and desirable physical, mechanical, electrical and/or magnetic properties to the composition. In many cases, the use and effects of the presence of a pigment in such compositions are materially enhanced if the pigment is made as compatible as possible with the other components of the composition into which it is incorporated. For example, a pigment which is readily dispersible in a given vehicle imparts uniform color to said vehicle without the occurrence of streaking or specking. Moreover, with uniform dispersion, faster color development is obtained, as is greater strength of color.

Pigments are generally admixed with a vehicle either in dry color form or directly from the pigment presscake. In systems of this latter nature, the presence of low water content and high pigment content is highly desirable in permitting greater flexibility in formulation. The presence of less water permits the addition of desirable ingredients such as binders and surface active agents without lowering the ultimate pigment content of such formulations.

When aqueous slurries of pigments are handled or shipped, however, it is very desirable that the physical form of this slurry be of a viscosity that is quite fluid. Viscous slurries that prevent easy flow of the pigment usually pose handling difficulties resulting in loss of materials in large scale operations.

It is well known that it is quite difficult to prepare fluid dispersions of various organic pigments, especially where a high pigment content is desirable. Numerous pigment applications, such as textile printing, and water base paints, require a high pigment ratio dispersion.

Accordingly, it is an object of this invention to provide methods of treating pigments to form low viscosity dispersions and of treating pigment slurries to lower the viscosities thereof. In both methods, a very high viscosity, if not solid mass would result, if it were not for the treatment of the present invention.

It is another object of this invention to provide pigment compositions exhibiting improved dispersibility in vehicle systems.

It is still another object of the present invention to provide methods for treating pigment compositions to effect materially enhanced dispersibility of such treated pigments in vehicle systems.

It is a still further object of this invention to provide treating methods which are readily amenable to and capable of incorporation in standard pigment production methods.

It is yet a further object of the present invention to provide methods of treating pigment compositions to materially increase the pigment content of certain pigment presscakes, thereby permitting the use of pigment presscakes in various applications requiring a high pigment-to-binder ratio.

These, as well as other objects, are accomplished by the present invention, which provides a method for treating organic pigments comprising contacting a dispersion of an organic pigment with a metal salt of naphthenic acid or octanoic acid, said metal salt being formed with a metal selected from the group consisting of zirconium, barium, iron, zinc, calcium, antimony, lithium and strontium, and subjecting the resulting mixture to agitation to obtain a low viscosity, high pigment ratio dispersion.

The type of pigment to be treated in accordance with the present invention is not considered critical. It is currently believed that the dispersibility of any organic pigment can be enhanced by treatment according to the present invention. It has been found that pigments derived from pyrroles such as the metal tetrazaporphine pigments, specifically the copper phthalocyanines; the carbazoles, such as ethyl carbazole as well as other vat pigments, such as diazines, as for example, Indanthrene Scarlet, are especially subject to enhancement by the present invention. Thus, such pigments as copper phthalocyanine blue, including both the alpha- and beta-forms thereof, polyhalogenated metal phthalocyanines such as polychlorinated copper phthalocyanine green, carbazole dioxazine violet, Indanthrene Scarlet R and the like, can be suitably employed.

In one aspect of the invention, a pigment, in the form of a pulp or paste, can be admixed with water to form a dispersion or slurry exhibiting a solids content of from about 5% to about 35%. In another aspect, the pigment can be prepared for salt milling, a technique known in the art, such as by admixing a pigment base with a grinding aid, which may be of the removable type, such as sodium chloride, which can be leached with water, or calcium carbonate, which can be leached with acid, or materials which can remain with the ground pigment to act as extenders, such as diatomaceous earth, powdered silica, and the like. The pigment and grinding aid are dispersed in an organic liquid, such as ethylene glycol, glycerol and the like, and in some cases, in water or mixtures of organic liquids, to form a viscous mass having the pigment dispersed therein.

The resulting pigment dispersion is then contacted with a metal salt of naphthenic acid or octanoic acid wherein the metal is a member selected from the group consisting of zirconium, barium, iron, zinc, calcium, antimony, lithium and strontium, in an inert organic solvent such as mineral spirits, aromatic solvents containing from about 6 to about 12 carbon atoms, such as toluene, xylene, benzene and the like, aliphatic solvents containing from about 5 to about 20 carbon atoms, such as hexane, heptane and the like, or mixtures of said aliphatic and aromatic solvents. Generally these solutions contain the metal salts in amounts ranging from about 1% to about 25% by weight. It has been found in accordance with the present invention that the amount of the solution useful in obtaining improved dispersibility generally ranges from about 1% to about 50%, by weight, of such solution based on the weight of the pigment thereby providing a treated organic pigment containing intimately admixed therewith from 0.01 to about 15 parts metal salt per 100 parts organic pigment. Preferably an amount of solution ranging from about 5 to about 15% by weight is employed. Below about 1%, the improvement does not appear to be commercially significant; while above about 50%, there is no appreciable added improvement. The specific amount of solution employed is dictated primarily by texture requirements, economics and the characterics of the pigment treated.

These metal salt solutions can be employed directly with an aqueous slurry of the pigment or in a salt milling operation. The metal salt solutions can also be emulsified, if desired, by admixture with water and an emulsifying agent. Generally, from about 0.5% to about 15%, based on the weight of pigment, of a conventional emulsifying agent such as a polyoxyethylated vegetable oil, a sulfonated aliphatic polyester, alkylphenoxypoly (ethyleneoxy) ethanol and the like, is sufficient for this purpose.

In one embodiment of the present invention, a method of improving the dispersibility of pigments is provided comprising contacting an aqueous slurry of the pigment with an emulsion of a metal salt as defined herein. The resulting system is agitated for a period of time ranging from about 10 minutes to about 24 hours, at temperatures ranging from about room temperature to about 100° C. Temperature is not considered critical, and higher or lower temperatures can be employed, if desired. Preferably, however, room temperature is employed. After stirring, the resulting slurry is filtered and the presscake is recovered and can be used directly. It has been found that the process of the present invention results in the obtainment of a presscake exhibiting a significantly enhanced pigment content. Moreover, it has also been found that the presscake is readily dispersible in a wide variety of vehicles.

In an alternate embodiment, an aqueous slurry of pigment is contacted directly with a solution of a metal salt. The resulting mixture is stirred continuously for a period ranging from about 10 minutes to about 24 hours, or until the respective ingredients are well mixed. The slurry is then filtered and the residue washed and dried at temperatures ranging from about 50° C. to about 100° C. and then ground in conventional manner, such as in a hammer mill. The dried pigments prepared in the manner described herein exhibit significantly improved dispersibility and strength of color development in a wide variety of vehicles.

In still another embodiment, a solution of a metal salt as hereinabove described can be added to a pigment pulp or paste prior to the dispersion thereof or directly to a pigment dispersion to obtain a low viscosity dispersion. Pigment slurries advantageously treated in accordance with the present invention are those containing a high pigment ratio. In the absence of treatment with metal salts in accordance with the present invention, such high pigment ratio dispersions would exhibit very high viscosities and, in many instances, would be solid masses. By treatment in accordance with the present invention, low viscosity, high pigment ratio dispersions can be obtained which are quite useful in current fluid handling and metering systems.

Pigments treated in accordance with the present invention resemble analogous untreated organic pigments in appearance. They differ from the untreated types in their improved dispersibility and rate of strength development. The pigments of the present invention can be used for coloration of polymers, including plastics, and elastomers, in the production of ink, paint, lacquer and the like. Incorporation of the pigment is effected according to conventional procedures.

Although the use of solutions of metal salts in accordance with the present invention is sufficient to give improved pigment softness, conventional surface-active agents, such as sodium lauryl sulfate, alkylphenoxy poly (ethyleneoxy) ethanols, sulfonated aliphatic polyesters and the like, as well as other conventional additives, can be employed to further enhance the usefulness of these pigments.

In a still further embodiment of the present invention, pigments are salt-milled in the presence of a metal salt solution of the present invention. A dispersion of the pigment and a dry grinding aid in an inert organic liquid is admixed with the metal salt solution of the present invention in an intensive mixing or grinding device such as a dough mixer, ball mill and the like. Upon completion of the conventional salt milling operation, the resulting milled mass is immersed in water and stirred until the grinding aid has been dissolved, if this is necessary. The residue is filtered and washed free of the grinding aid. Thereafter, the conditioned pigment residue is dried at temperatures ranging from about 50° C. to about 100° C. and ground in conventional manner, such as by a hammer mill, so as to pass through a 1/64" to 1/16" screen. The dried pigments prepared in this manner show improved dispersibility and strength of development in a wide variety of vehicles.

The following examples further define, describe and compare methods of preparing the improved pigments of the present invention and of utilizing them to develop color in a wide variety of vehicles. Parts and percentages are by weight unless otherwise indicated.

EXAMPLE 1

100 parts of precipitated copper phthalocyanine blue pigment paste containing 15% of copper phthalocyanine blue, is reslurried in 400 parts of water. An emulsion containing about 0.75 part of an 8% solution of strontium naphthenate in mineral spirits, 0.15 part of sodium bis-(2,6-dimethylheptyl) sulfosuccinate, an anionic surfactant, and 10 parts of water is admixed with the pigment slurry and stirred for about 15 minutes. The resulting slurry is filtered and drawn dry on a vacuum filtering funnel.

The resulting presscake comprises a copper phthalocyanine blue pigment paste containing about 30% of copper phthalocyanine blue, as compared to the original pigment paste containing 15% copper phthalocyanine blue.

EXAMPLE 2

100 parts of precipitated copper phthalocyanine blue pigment paste containing essentially 15% of copper phthalocyanine blue is reslurried in 400 parts of water. An emulsion containing about 1.5 parts of a 6% solution of zirconium octoate in mineral spirits, 0.15 part of a polyoxyethylated castor oil, a nonionic surfactant, and 15 parts water is admixed with the pigment slurry and stirred for about 10 minutes. The resulting slurry is filtered and drawn dry on a vacuum filtering funnel.

The resulting presscake comprises a copper phthalocyanine blue pigment paste containing about 35% copper phthalocyanine blue pigment.

EXAMPLE 3

Employing the identical procedure described in Example 1 but substituting barium octoate in lieu of strontium naphthenate, the resulting presscake comprises a copper phthalocyanine blue pigment paste containing about 27% copper phthalocyanine blue pigment.

EXAMPLES 4–10

Employing the identical procedure described in Example 1 using 100 parts of a precipitated copper phthalocyanine blue pigment paste containing 16.5% copper phthalocyanine blue pigment, several metal salts of the present invention are employed to obtain high solids presscakes. Table I below summarizes the results obtained:

TABLE I

| Example: | Metal salt | Percent phthalocyanine blue pigment in presscake |
|---|---|---|
| 4 | Iron octoate | 31.8 |
| 5 | Zinc octoate | 30.5 |
| 6 | Calcium octoate | 26.3 |
| 7 | Zirconium octoate | 30.0 |
| 8 | Antimony naphthenate | 27.8 |
| 9 | Zirconium naphthenate | 34.9 |
| 10 | Lithium naphthenate | 31.8 |

EXAMPLE 11

An alpha form of copper phthalocyanine blue pulp is admixed with water to obtain a slurry having a 5.0% pigment concentration. The slurry is stirred with a conventional agitator. A 6% solution of zirconium octoate in mineral spirits equivalent to 3% of the weight of pigment is admixed with the slurry and stirring continued at 90° C. for one hour. The resulting slurry is filtered, washed with water and the residue is dried at 90° C. for 2 hours. The dried product is hammer milled through a 1/16 inch screen.

(A) Tinted vinyl sheets are prepared using untreated alpha copper phthalocyanine blue in one set as the control and alpha copper phthalocyanine blue treated in the manner described above in the other set. In each set, 0.400 gram of pigment and 200 grams vinyl resin composition are milled at 280° F. and 0.030 inch clearance on a 2-roll mill. Milled sheets are prepared for each set at 5, 15 and 30 passes.

In all instances, the treated pigment shows significantly less streaking and specking than the control, develops faster and possesses greater strength.

(B) Inks are prepared employing the untreated control pigment and the treated pigments taken from successive passes on a 3-roll mill. Tints are prepared comprising 50 parts air-drying white ink and 1 part paste. The pastes comprise 5 parts treated or untreated (control) pigments and 10 parts air drying varnish. The inks prepared from the treated pigments show greater strength when compared to inks prepared from the untreated (control) pigments, indicating better dispersion in the varnish.

EXAMPLE 12

Employing the identical procedure described in Example 11 but using the beta form of copper phthalocyanine blue in lieu of the alpha form, substantially similar test results are obtained.

EXAMPLE 13

Employing the identical procedures described in Example 11 but using polychlorinated copper phthalocyanine green in lieu of the alpha form of copper phthalocyanine blue, substantially similar test results are obtained.

EXAMPLE 14

Employing the identical procedure described in Example 11 but using carbazole dioxazine violet in lieu of the alpha form of copper phthalocyanine blue, substantially similar test results are obtained.

EXAMPLE 15

Employing the identical procedure described in Example 11 but using Indanthrene Scarlet R in lieu of the alpha form of copper phthalocyanine blue, substantially similar test results are obtained.

EXAMPLE 16

Employing the identical procedure described in Example 1 but employing an 8% solution of strontium naphthenate in an amount equivalent to 3% of the weight of pigment in lieu of the zirconium octoate solution, substantially similar test results are obtained.

EXAMPLE 17

Employing the identical procedure described in Example 1 but employing 5% based on the weight of pigment of a 6% solution of zirconium octoate in combination with 10%, based on the weight of pigment, of sodium lauryl sulfate, substantially similar test results are obtained.

EXAMPLE 18

Employing the identical procedure described in Example 17 but substituting a polyoxyethylated castor oil in lieu of the sodium lauryl sulfate, substantially similar test results are obtained.

EXAMPLES 19–23

Employing the identical procedure described in Example 11, various metal salts of the present invention are evaluated employing the Harmon Softness Test.

The Harmon Softness Test is conducted as follows:

0.05 gram of the dye pigment under evaluation is added to 5 grams of a paste of zinc oxide (65%) in a drying oil. The pigment and paste are first admixed with a spatula and then placed in a Hoover Laboratory Muller and ground. Samples of the ground paste are taken after 2 x 25 revolutions
4 x 25 revolutions
6 x 25 revolutions and applied to white paper. The depth or strength of color is observed.

The following metal salts are employed and compared to a control sample employing untreated pigment: barium octoate, zirconium octoate, lithium naphthenate, antimony naphthenate and zirconium naphthenate. In all instances, the depth of color is significantly greater for each of the metal salt-treated pigments than for the control pigment.

EXAMPLE 24

Into a heavy duty dough type mixer are introduced 100 parts crude copper phthalocyanine blue base, 500 parts finely pulverized sodium chloride, 5 parts of a 6% solution of zirconium octoate in mineral spirits and about 100 parts ethylene glycol to obtain a viscous kneading mass. After a milling period of about six (6) hours, the mass is removed and immersed in water to remove the sodium chloride grinding aid. The pigment residue, the beta form of copper phthalocyanine blue, is isolated by filtration, washed, dried and hammer milled through a 1/16 inch screen.

Employing the test procedures set forth in A and B of Example 11, tinted vinyl sheets and inks, respectively, are prepared employing untreated copper phthalocyanine blue obtained by salt milling as a control and the treated copper phthalocyanine blue obtained above.

The tinted vinyl sheets prepared with treated pigment show considerably less streaking and specking, develop faster and possess greater strength than those obtained using the control pigment.

The inks obtained with the treated pigment show greater strength when compared to inks containing the control pigment, indicting better dispersion in the varnish.

EXAMPLE 25

Employing the identical procedure described in Example 24 but substituting a polyhalogenated copper phthalocyanine green base in lieu of the copper phthalocyanine blue base, substantially similar test results are obtained.

EXAMPLE 26

Employing the identical procedures described in Example 24 but substituting carbazole dioxazine violet base in lieu of the copper phthalocyanine blue base, substantially similar test results are obtained.

EXAMPLE 27

Employing the identical procedures described in Example 24 but substituting Indanthrene Scarlet R base in lieu of copper phthalocyanine blue base, substantially similar test results are obtained.

EXAMPLES 28–32

Employing the identical procedures described in Example 24, various metal salts of the present invention are evaluated employing the Harmon Softness Test. The test method is described in Examples 19–23.

The following metal salts are employed and compared to a control sample employing untreated pigment: barium octoate, zirconium octoate, lithium naphthenate, antimony naphthenate and zirconium naphthenate. In all instances, significantly enhanced strength development is exhibited for each of the metal salt-treated pigments than for the control pigment.

EXAMPLE 33

100 pounds of a dispersion of copper phthalocyanine blue, containing essentially 24 pounds of a copper phthalocyanine blue pigment, 2.4 pounds of a sodium salt of an alkylated naphthalene sulfonic acid, an anionic dispersing agent, was admixed with 0.8 pound of a 6% solution of barium octoate in mineral spirits and 0.12 pound of sodium bis(2,6-dimethylheptyl)sulfosuccinate wtih vigorous agitation. The dispersion, which prior to the addition of the barium octoate solution, was practically a solid paste, thinned to a fluid, pourable slurry.

EXAMPLE 34

24 pounds of a copper phthalocyanine blue presscake, dry basis, was slurried in 400 pounds of water. 1.2 pounds of a 6% solution of strontium naphthenate in mineral spirits and 0.2 pound of a polyoxyethylated castor oil were added to the slurry with agitation. The resulting pigment slurry was filtered to form a presscake. The resulting presscake was dispersed with 2.4 pounds of a sodium salt of an alkylated naphthalene sulfonic acid dispersant with vigorous agitation. The finely dispersed slurry exhibited a thin, fluid viscosity.

EXAMPLE 35

24 pounds of copper phthalocyanine blue presscake, dry basis, was treated wtih 2.4 pounds of a 6% solution of zirconium octoate in mineral spirits and 0.2 pound of sodium bis(2,6-dimethylheptyl)sulfosuccinate. The resulting presscake was dispersed with 8.2 pounds of a nonylphenoxypoly(ethyleneoxy) ethanol, a non-ionic dispersing agent, to give a fluid thin dispersion after vigorous agitation.

Although specific materials and conditions are set forth in the above exemplary processes in treating and using the pigments of this invention, these are merely intended as illustrations of the present invention. Various other pigments, solvents, additives and processes, such as those listed above, may be substituted in the examples with similar results.

Other modifications of the present invention will occur to those skilled in the art upon a reading of the present disclosure. These are intended to be included within the scope of this invention.

What is claimed is:

1. Method for treating organic pigments selected from the group consisting of metal tetrazaporphine pigments, carbazole pigments and diazine pigments comprising contacting a dispersion of said pigment with a metal salt of naphthenic acid or octanoic acid, said metal salt being formed with a metal selected from the group consisting of zirconium, barium, iron, zinc, calcium, antimony, lithium and strontium and subjecting the resulting mixture to agitation to obtain a low viscosity, high pigment ratio dispersion.

2. Method as defined in claim 1 wherein the organic pigment dispersion is an aqueous slurry of the organic pigment.

3. Method as defined in claim 1 wherein the organic pigment dispersion comprises an organic pigment and a grinding aid dispersed in an inert organic liquid.

4. Method as defined in claim 1 wherein the organic pigment dispersion is contacted with a solution of the metal salt in an inert organic solvent.

5. Method as defined in claim 4 wherein the inert organic solvent is selected from the group consisting of mineral spirits, aromatic solvents containing from about 6 to about 12 carbon atoms, aliphatic solvents containing from about 5 to about 20 carbon atoms and mixtures of said aromatic and aliphatic solvents.

6. Method as defined in claim 5 wherein the concentration of metal salt in the organic solution ranges from about 1 to about 25% by weight.

7. Method as defined in claim 4 wherein the organic pigment dispersion is contacted with from about 1% to about 50% by weight of the metal salt solution, based on the weight of pigment.

8. Method as defined in claim 7 wherein from about 5 to about 15% by weight of said metal salt solution is employed.

9. Method as defined in claim 1 wherein the organic pigment dispersion is contacted with an aqueous emulsion containing the metal salt.

10. Method as defined in claim 9 wherein the aqueous metal salt emulsion comprises a metal salt in an inert organic solvent, water and an emulsifying agent.

11. Method as defined in claim 10 wherein the emulsifying agent is employed in amounts of from about 0.5% to about 15% based on the weight of pigment.

12. Method for treating organic pigments selected from the group consisting of metal tetrazaporphine pigments, carbazole pigments and diazine pigments comprising contacting an aqueous slurry of said pigment with a solution of a metal salt of naphthenic acid or octanoic acid, said metal salt being formed with a metal selected from the group consisting of zirconium, barium, iron, zinc, calcium, antimony, lithium and strontium in an inert organic solvent, agitating the resulting mixture, removing substantially all of the water from the resulting mixture and recovering the pigment presscake.

13. Method as defined in claim 12 wherein the presscake is dried at temperatures ranging from about 50° C. to about 100° C. and thereafter ground to obtain dried pigment.

14. Method as defined in claim 12 wherein the aqueous slurry of an organic pigment is contacted with an aqueous emulsion containing the metal salt.

15. Method as defined in claim 13 wherein the aqueous slurry of an organic pigment is contacted with an aqueous emulsion containing the metal salt.

16. Method for treating organic pigments selected from the group consisting of metal tetrazaporphine pigments, carbazole pigments and diazine pigments comprising contacting a dispersion of said pigment and grinding aid in an inert organic liquid with a solution of a metal salt of naphthenic acid or octanoic acid, said metal salt being formed with a metal selected from the group consisting of zirconium, barium, iron, zinc, calcium, antimony, lithium and strontium in an inert organic solvent in an intensive mixing zone, agitating the resulting mixture in said zone, substantially removing the organic liquid, drying the residue at temperatures ranging from about 50° C. to about 100° C., grinding the dried residue and recovering the dried pigment.

17. Method as defined in claim 16 wherein upon removal of the mixture from the intensive mixing zone, the grinding aid is substantially removed.

18. Method for forming low viscosity, high pigment ratio dispersions comprising admixing an organic pigment selected from the group consisting of metal tetrazaporphine pigments, carbazole pigments and diazine pigments with a metal salt of naphthenic acid or octanoic acid, said metal salt being formed with a metal selected from the group consisting of zirconium, barium, iron, zinc, calcium, antimony, lithium, and strontium, and dispersing the resulting treated pigments in a dispersant to obtain a low viscosity, high pigment ratio dispersion.

19. An organic pigment composition comprising an organic pigment selected from the group consisting of metal tetrazaporphine pigments, carbazole pigments and diazine pigments intimately admixed with from 0.01 to about 15 parts of a metal salt of naphthenic acid or octanoic acid, said metal salt being formed with a metal selected from the group consisting of zirconium, barium, iron, zinc, calcium, antimony, lithium, and strontium, per 100 parts of organic pigment.

References Cited

UNITED STATES PATENTS

| | | | |
|---|---|---|---|
| 2,236,296 | 3/1941 | Minich et al. | 106—308 Q |
| 2,294,381 | 9/1942 | Burdick | 106—288 Q |
| 2,350,520 | 6/1944 | O'Neal | 106—308 F |

FOREIGN PATENTS

| | | | |
|---|---|---|---|
| 224,322 | 10/1959 | Australia | 106—308 F |
| 245,475 | 6/1963 | Australia | 106—288 Q |
| 655,458 | 7/1951 | Great Britain | 106—308 F |

HELEN M. S. SNEED, Primary Examiner

U.S. Cl. X.R.

106—308 F; 308 Q